(12) United States Patent
Stone

(10) Patent No.: US 7,987,710 B2
(45) Date of Patent: Aug. 2, 2011

(54) PRESSURE VESSEL WITH CO₂ LIQUID LEVEL INDICATOR FOR A PAINTBALL MARKER

(75) Inventor: Mark W. Stone, Springboro, OH (US)

(73) Assignee: Gayston Corporation, Springboro, OH (US)

( * ) Notice: Subject to any disclaimer, the term of this patent is extended or adjusted under 35 U.S.C. 154(b) by 0 days.

(21) Appl. No.: 12/819,836

(22) Filed: Jun. 21, 2010

(65) Prior Publication Data

US 2010/0276326 A1    Nov. 4, 2010

Related U.S. Application Data

(63) Continuation of application No. PCT/US2008/087986, filed on Dec. 22, 2008.

(60) Provisional application No. 61/015,893, filed on Dec. 21, 2007.

(51) Int. Cl.
 *G01F 23/62* (2006.01)
 *F41B 11/00* (2006.01)

(52) U.S. Cl. ............... 73/293; 73/309; 73/314; 124/74

(58) Field of Classification Search ............. 73/290 R, 73/293, 305, 306, 307, 308, 309, 314, 322.5; 124/74
See application file for complete search history.

(56) References Cited

U.S. PATENT DOCUMENTS

| | | | |
|---|---|---|---|
| 4,064,755 A | 12/1977 | Bongort et al. | |
| 4,959,997 A * | 10/1990 | Aisa et al. | 73/308 |
| 5,645,336 A * | 7/1997 | Brown et al. | 362/26 |
| 5,647,656 A * | 7/1997 | Brown et al. | 362/551 |
| 6,502,461 B2 * | 1/2003 | Keller | 73/305 |
| 7,360,529 B2 * | 4/2008 | Ziegler et al. | 123/509 |
| 2004/0129075 A1* | 7/2004 | Sorenson | 73/313 |
| 2005/0109105 A1* | 5/2005 | Kowalski et al. | 73/313 |
| 2006/0281896 A1 | 12/2006 | Bohnert et al. | |
| 2007/0017497 A1 | 1/2007 | Masse | |
| 2008/0098809 A1* | 5/2008 | Skinner | 73/290 R |

FOREIGN PATENT DOCUMENTS

| WO | WO 9743604 A1 * | 11/1997 |
|---|---|---|
| WO | 03060436 | 7/2003 |

OTHER PUBLICATIONS

International Search Report, Form PCT/ISA/210, mailing date of Feb. 19, 2009.

* cited by examiner

*Primary Examiner* — Troy Chambers
(74) *Attorney, Agent, or Firm* — Wood, Herron & Evans, L.L.P.

(57) ABSTRACT

A pressure vessel 12 with a $CO_2$ liquid level indicator 14, for use with a paintball marker 10, includes a magnetic float assembly 42 disposed within the pressure vessel 12 and adapted to float on liquid phase $CO_2$ 39 contained within the pressure vessel 12, in combination with a magnetically sensitive indicator 44 on an outer surface 40 of the pressure vessel 12 and which is adapted to detect and to display the location of the magnetic float assembly 42 within the pressure vessel 12. When connected to a conventional paintball marker 10, the pressure vessel 12 magnetically shows the indicated location of the magnetic float assembly 42, thereby showing the amount of liquid phase $CO_2$ 39 remaining within the pressure vessel 12. This remaining amount of liquid phase $CO_2$ 39 can be correlated to an approximate number of additional paintball rounds that can be shot before the $CO_2$ is depleted.

21 Claims, 5 Drawing Sheets

US 7,987,710 B2

PRESSURE VESSEL WITH $CO_2$ LIQUID LEVEL INDICATOR FOR A PAINTBALL MARKER

This application claims priority from currently pending U.S. Provisional Application No. 61/015,893, filed on Dec. 21, 2007, which is expressly incorporated by reference herein, in its entirety. The owner of the present application is Gayston Corporation ("Gayston"). Gayston also owns currently pending PCT Application No. PCT/US2008/057039, filed on Mar. 14, 2008, and entitled "Pressure Bottle For Paintball Marker," which is expressly incorporated by reference herein, in its entirety.

TECHNICAL FIELD

This invention relates to a pressure vessel which holds pressurized stored gas, and particularly to a pressure vessel used in paintball activities.

BACKGROUND

Gayston manufactures pressure vessels which hold pressurized stored gases including carbon dioxide ("$CO_2$"), nitrogen and air. These pressurized gases are used in a variety of applications to operate sports equipment (ex: in paintball markers to propel the paintballs) and construction tools (ex: in portable power nailers), and in other applications where controlled bursts of pressurized gas are used to provide energy to operate a mechanism.

In the interest of efficient, safe and convenient use of products powered by pressurized gas, the user needs to be able to monitor the quantity of remaining gas which may be dispensed from the vessel before it needs to be re-filled or replaced. A pressure vessel containing nitrogen or air is filled until the gas in the vessel reaches a predetermined pressure based on the vessel's pressure rating. Then, as the gas is depleted, the pressure in the vessel drops steadily until all pressurized gas has left the vessel. The level of gas remaining in the vessel during use can therefore be determined by monitoring the pressure level of the gas remaining in the vessel as compared to its full pressure reading using a pressure gauge.

A pressure vessel containing $CO_2$, however, is filled not to the vessel's pressure rating, but to a predetermined weight of $CO_2$ based on the vessel weight capacity rating. This is because the pressure in a pressure vessel filled with $CO_2$ will be the same for a given $CO_2$ temperature regardless of the vessel's level of $CO_2$ fill. For example, two pressure vessels filled with $CO_2$, one to 20% of capacity and one to 80% capacity, will both have an internal pressure of about 860 PSI at 68F. This behavior of $CO_2$ occurs because pressurized $CO_2$ exists simultaneously in both liquid and gas phases across a wide range of operating pressures and temperatures. When $CO_2$ is depleted from the vessel during use, additional liquid $CO_2$ inside the vessel "boils off" to form more gas $CO_2$ until the equilibrium pressure for the $CO_2$ in the vessel at its temperature is reached. This constant pressure-at-temperature characteristic for $CO_2$ continues until all of the liquid $CO_2$ has "boiled off," after which the vessel will only contain gas phase $CO_2$. The gas phase $CO_2$ pressure will then gradually be reduced as the remaining gas is depleted (as is the case for air and nitrogen gases as noted above). Consequently, the use of a pressure gauge to monitor the $CO_2$ remaining in a pressure vessel does not provide an accurate indication of fill level until all of the liquid phase $CO_2$ has been depleted, after which the pressure in the vessel finally begins to drop proportionate to the use of the remaining gas phase $CO_2$. This occurs only when the vessel is nearly empty.

For example, the pressure vessels used in paintball markers typically contain all gas phase $CO_2$ at about 10% or less of capacity. In this example, a pressure gauge will only accurately read the final 10% or less of $CO_2$ depletion. A paintball player with less than 10% $CO_2$ has to become very conservative with shots to avoid running out of pressurized gas. Furthermore, it would be advantageous for paintball players to be able to check the level of $CO_2$ remaining in a previously-used pressure vessel before going to a paintball park with a mostly depleted pressure vessel. Current pressure gages used on similar pressure vessels are rendered effectively useless for these paintball players. It would be desirable to solve these problems described and determine the liquid level of $CO_2$ contained within a pressurized vessel, particularly a pressurized vessel used for paintball applications.

SUMMARY

To solve these problems, the present invention relates to a pressure vessel for holding $CO_2$, and uses a magnetic float assembly sized to be placed within the pressure vessel; the magnetic float assembly cooperative with a magnetically sensitive indicator located on an outer surface of the pressure vessel. The magnetic float assembly floats on liquid phase $CO_2$ contained within the pressure vessel and operates over a range of operating vessel temperatures. The magnetically sensitive indicator detects and displays the location of the magnetic float assembly, so that the user can see the detected level of the liquid phase $CO_2$ remaining in the pressure vessel. Because the present invention enables a user to detect the level of liquid phase $CO_2$ remaining in the pressure vessel, in the paintball context, the present invention enables the user to determine an estimated number of remaining paintball rounds or shots which can be fired.

More specifically, the magnetic float assembly includes an elongated member having first and second ends with first and second permanent magnets mounted at the first and second ends, respectively. The first and second permanent magnets are oriented so that their respective poles are in opposing relation to each other. According to one preferred embodiment, the elongated member is a composite foam material containing syntactic foam having a rectangular cross-sectional shape. The syntactic foam has a plurality of hollow glass microspheres embedded in resin. Alternatively, the elongated member can include a tube. The elongate member has a length shorter than the inner body diameter of the pressure vessel so that the magnetic float assembly can rotate freely within the pressure vessel.

According to the first preferred embodiment, the magnetically sensitive indicator includes a label adhered to the pressure vessel, the label having a coating with a plurality of magnetically sensitive particles suspended thereon in a cured, colloidal dispersion. The density of the particles is sufficient to magnetically detect the magnets carried by the magnetic float assembly. The range of operating temperatures includes any temperature up to about 85° F.

As indicated above, the pressure vessel can be used advantageously with a paintball marker. In that context, the paintball marker includes a body including a handle, a firing chamber, a barrel coupled to the firing chamber, and a hopper adapted to deliver paintball rounds to the firing chamber, one round at a time. The paintball marker further has a pressure vessel operatively coupled to the body and adapted to deliver pressurized $CO_2$ to the firing chamber. The pressurized $CO_2$ expels the paintball round from the firing chamber and through the barrel. The pressure vessel is equipped with a $CO_2$ level indicator, including the magnetic float assembly and the magnetically sensitive indicator as described above. The magnetically sensitive indicator provides an accurate reading of $CO_2$ level in the pressure vessel when the pressure vessel is in a generally vertical orientation.

To determine the level of liquid phase $CO_2$ within the pressure vessel, a user can employ a method with the preferred embodiment of the pressure vessel described above. The method includes orienting a pressure vessel containing liquid phase $CO_2$ and a magnetic float assembly to a substantially vertical orientation. The pressure vessel has a magnetically sensitive indicator located on an outer surface of the pressure vessel. The method includes rotating or swirling the pressure vessel to rotate the magnetic float assembly into alignment with the magnetically sensitive indicator. The magnetically sensitive indicator magnetically indicates the position of the magnetic float assembly and the level of liquid phase $CO_2$ remaining in the pressure vessel. The user can then correlate the magnetically detected level of the magnetic float assembly to an approximate number of remaining paintball rounds.

These and other features of the invention will be readily understood in view of the following detailed description and the drawings

DETAILED DESCRIPTION OF THE PREFERRED EMBODIMENTS

Figure 1:
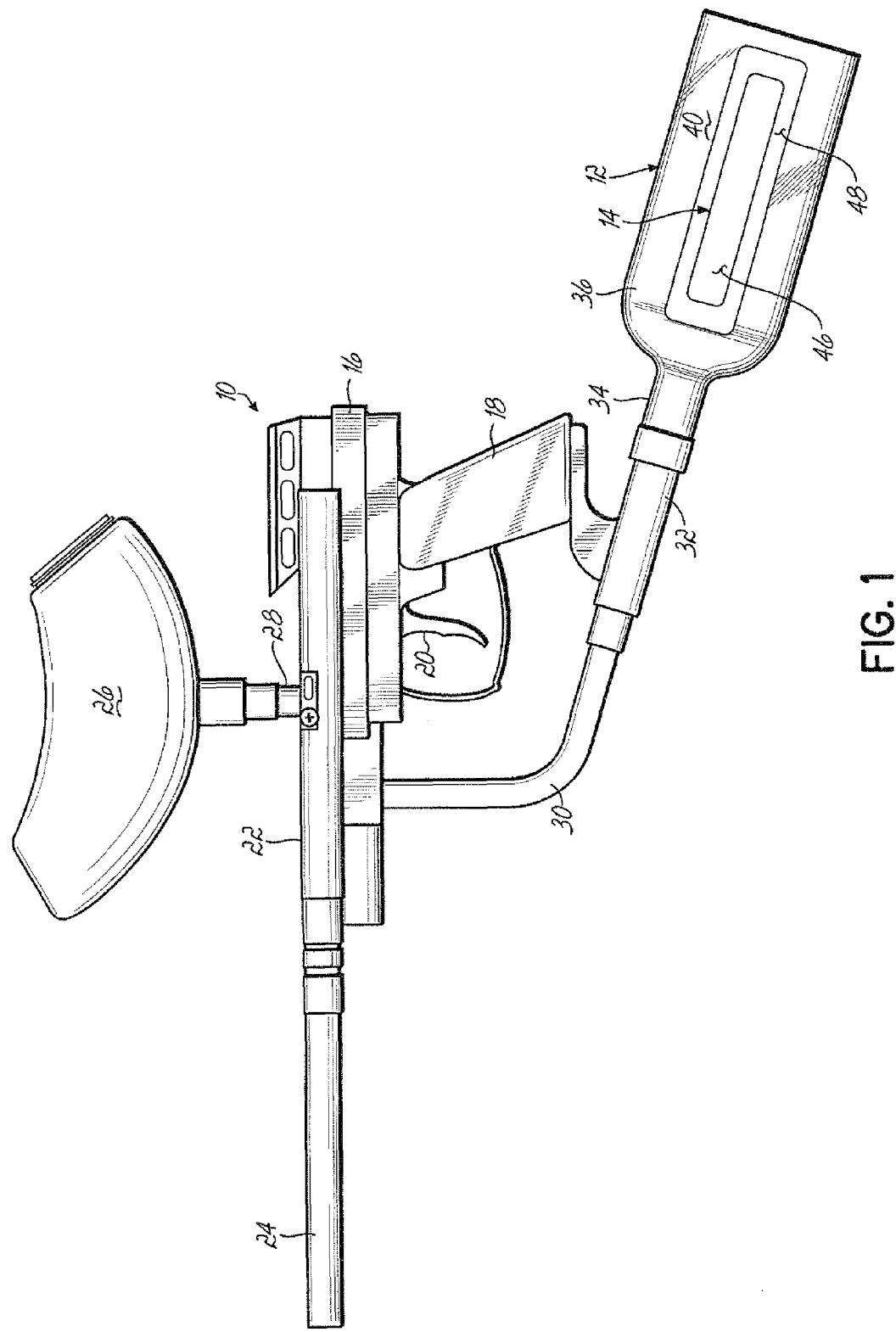
FIG. 1 is a front perspective view of a paintball marker including a pressure vessel for holding $CO_2$, in accordance with a first preferred embodiment of the invention.

FIG. 1 illustrates a paintball marker 10 including a pressure vessel 12 equipped with a $CO_2$ level indicator 14. The illustrated paintball marker 10 includes traditional elements such as a body 16, a handle 18, a trigger 20 operatively connected to the handle 18, a firing chamber 22, and a barrel 24 operatively coupled to the firing chamber 22. The paintball marker 10 also includes a hopper 26 located above the body 16, which delivers paintball rounds (not shown) to the firing chamber 22 through a connection tube 28, one round at a time. The body 16 also includes a gas inlet tube 30 extending from the firing chamber 22 to a vessel connection port 32 located below the handle 18 and the body 16. The vessel connection port 32 includes external threads (not shown) adapted to connect to the pressure vessel 12.

The pressure vessel 12 includes a neck 34 and a cylindrical body 36, the neck 34 including internal threads 38 to engage the external threads on the vessel connection port 32. The pressure vessel 12 contains pressurized gas phase $CO_2$ and liquid phase $CO_2$ 39, and the pressurized $CO_2$ is supplied to the firing chamber 22 to expel the paintball round through the barrel 24. The paintball marker 10 includes a valve assembly (not shown) to control the delivery of pressurized $CO_2$ from the pressure vessel 12 to the firing chamber 22. The opening of this valve assembly and the supply of paintball rounds from the hopper 26 are each simultaneously controlled by the trigger 20. The $CO_2$ level indicator 14 shows the amount of liquid phase $CO_2$ 39 held in the pressure vessel 12, and this amount can be correlated to an estimated number of shots that can be fired by the paintball marker 10 with this pressure cylinder 12. One skilled in the art will appreciate that the pressure vessel 12 described can be adapted to be used with any typical paintball marker that uses liquid phase $CO_2$ 39 as the pressurized fluid.

Figure 2:
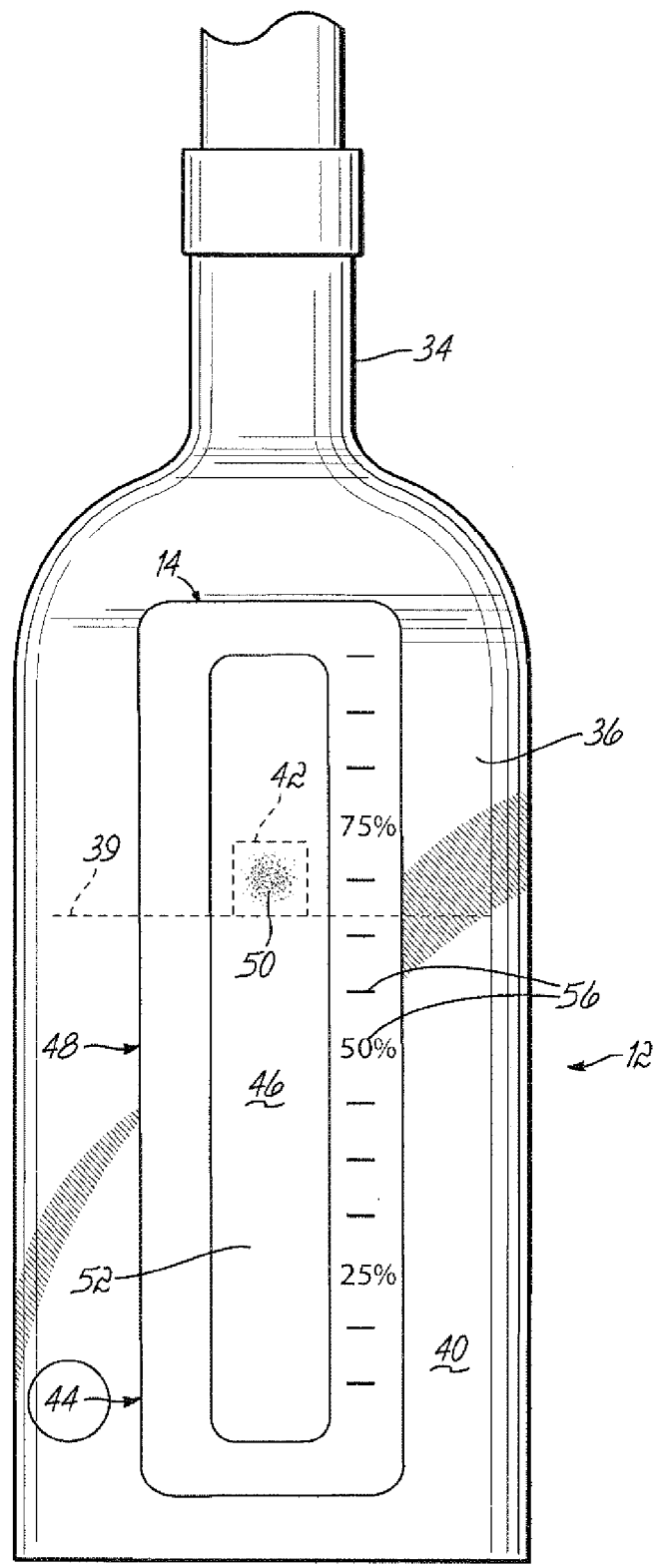
FIG. 2 is a front view of the pressure vessel illustrated in FIG. 1.
Figure 3:
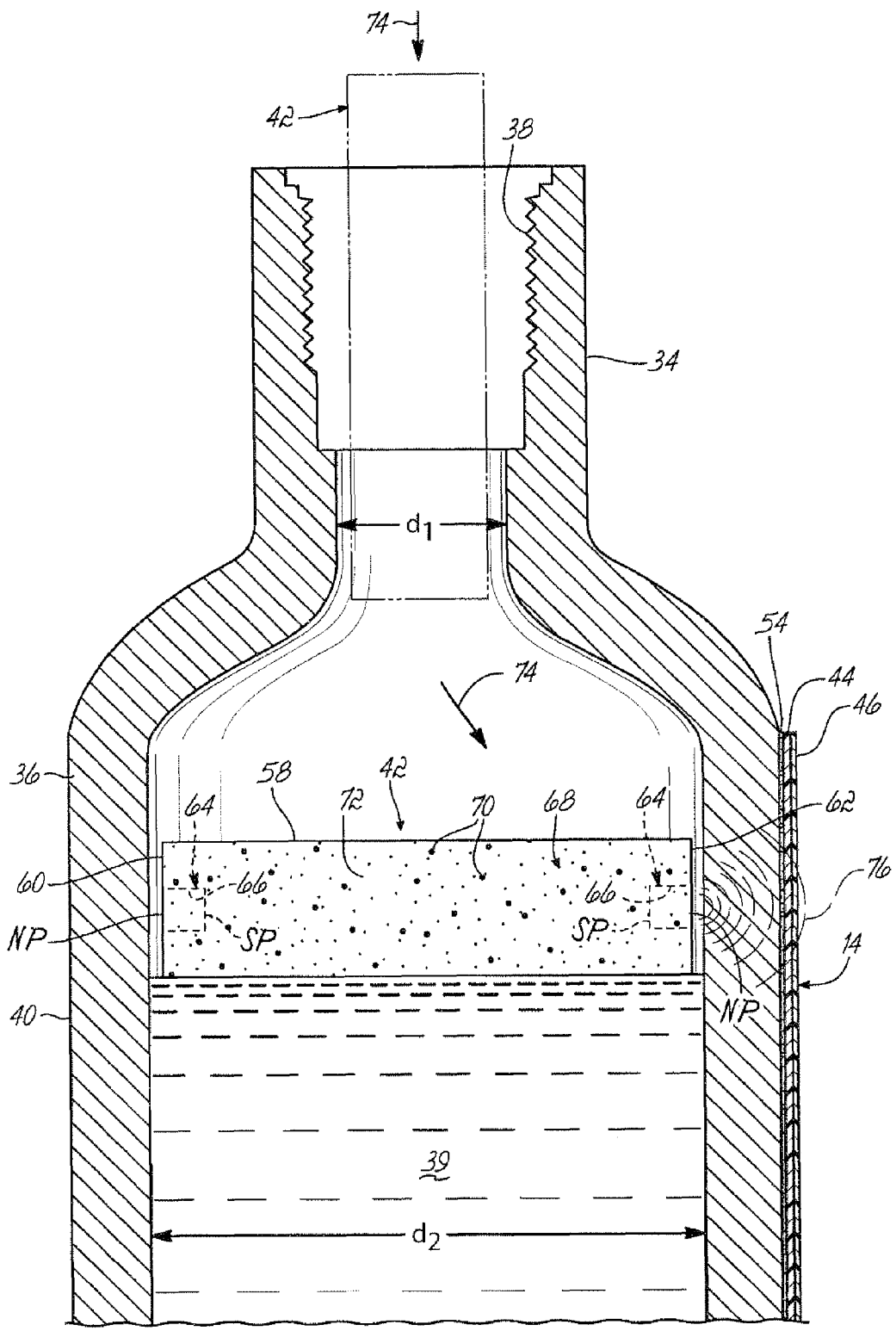
FIG. 3 is a longitudinal cross-sectional view of the pressure vessel shown in FIG. 2.
Figure 4:
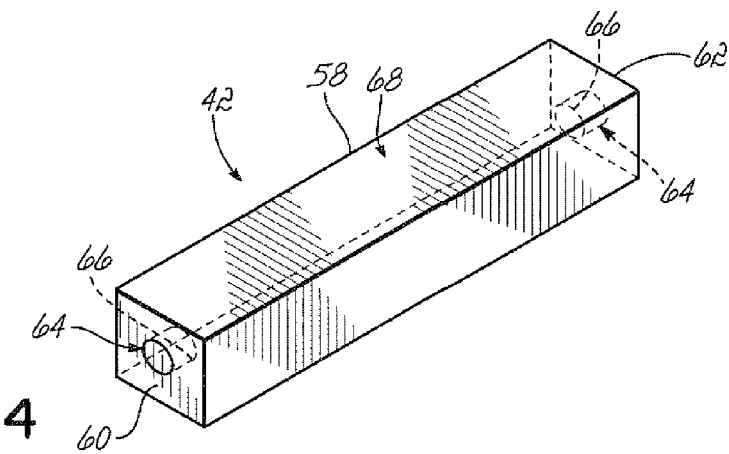
FIG. 4 is a perspective view of a magnetic float assembly according to a first preferred embodiment of the invention.
Figure 5:
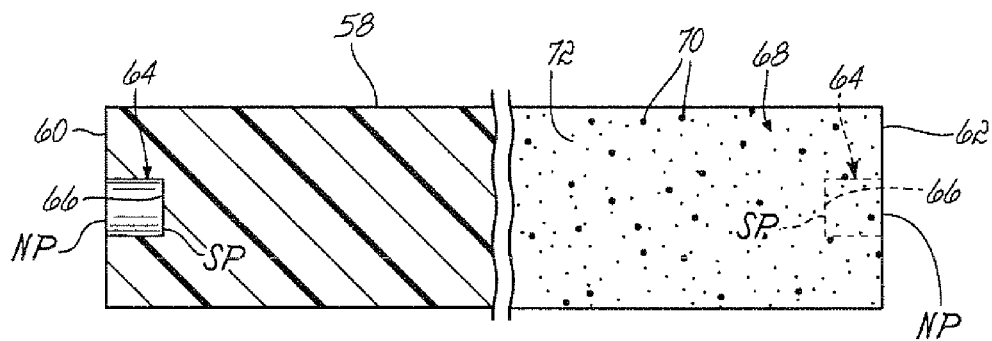
FIG. 5 is a longitudinal cross-sectional view of the magnetic float assembly shown in FIG. 4.

FIGS. 2 through 5 illustrate one embodiment of the pressure vessel 12 equipped with a $CO_2$ level indicator 14. The neck 34 of the pressure vessel 12 includes internal threads 38 as described above and an inner neck diameter $d_1$. The cylindrical body 36 includes an outer surface 40 and an inner body diameter $d_2$. The pressure vessel 12 includes a magnetic float assembly 42 disposed within the pressure vessel 12. The magnetic float assembly 42 floats on liquid phase $CO_2$ 39 contained within the pressure vessel 12. The magnetic float assembly 42 is designed to float on liquid phase $CO_2$ 39 over a range of operating vessel temperatures. For example, the magnetic float assembly 42 illustrated in FIGS. 3-5 is adapted to float on liquid phase $CO_2$ 39 for any temperature up to about 85 degrees Fahrenheit. Most houses and residential garages are maintained at temperatures just under 72 degrees Fahrenheit, and the pressure vessel 12 automatically chills below 60 degrees Fahrenheit when $CO_2$ is expelled from the pressure vessel 12. Consequently, the magnetic float assembly 42 will float on the liquid phase $CO_2$ 39 in most circumstances where the pressure vessel 12 is coupled to a paintball marker 10.

The pressure vessel 12 also includes a magnetically sensitive indicator 44 located on the outer surface 40 of the cylindrical body 36. The magnetically sensitive indicator 44 detects and displays the location of the magnetic float assembly 42 within the pressure vessel 12. The magnetically sensitive indicator 44 includes a coating 46 applied to a label 48 attached to the outer surface 40. The coating 46 is a plurality of magnetically sensitive particles 50 suspended in a cured colloidal dispersion 52 on an approximately 0.800" wide strip of mylar. The coating 46 is commercially available under the Mange-View® name from Magne-Rite Inc. based in Spokane Valley, Wash. The Magne-View® coating 46 has a standard thickness of 0.006" and includes nickel particles 50 which can freely move within the cured colloidal dispersion 52. The coating 46 is then attached to the label 48, which is held to the outer surface 40 of the pressure vessel 12 with adhesive material 54. The label 48 includes calibrated delineations 56 showing the approximate amount of $CO_2$ left in the pressure vessel 12 based upon the level of liquid phase $CO_2$ 39 and magnetic float assembly 42. The delineations 56 illustrated in FIG. 2 are percentages of original $CO_2$ placed in the pressure vessel 12, but the delineations 56 could be modified for a particular paintball marker 10 to show how many paintball rounds could be fired with the remaining $CO_2$ in the pressure vessel 12, or other information. When a permanent magnet is located behind the magnetically sensitive indicator 44, the magnetically sensitive particles 50 move within the cured colloidal dispersion 52 adjacent to the magnetic force of the permanent magnet. For the Magne-View® coating sold by Magne-Rite, the cured colloidal dispersion 52 is green in color and the nickel particles 50 will move to create a black line or spot (as illustrated in FIG. 2) where the magnetic force is located behind the coating 46.

As discussed above, the magnetic float assembly 42 must be designed to float on liquid phase $CO_2$ 39 to effectively detect the $CO_2$ level in the pressure vessel 12. All liquid $CO_2$ becomes gas at about 88 degrees Fahrenheit, and the magnetic float assembly 42 must also be able to withstand high pressures within the pressure vessel up to at least 3000 psi. Therefore, the magnetic float assembly 42 must contain a material that has a high compressive strength and low weight to compensate for the weight of the magnets. Two embodiments of the magnetic float assembly 42 meeting these design requirements are described in detail below.

One embodiment of the magnetic float assembly 42 disposed within the pressure vessel 12 is illustrated in detail in FIGS. 3-5. The magnetic float assembly 42 includes an elongate member 58 having a first end 60 and a second end 62. The magnetic float assembly 42 also includes first and second permanent magnets 64 respectively mounted at the first and second ends 60, 62. The permanent magnets 64 are cylindrical neodymium permanent nickel plated magnets having a 0.125" diameter and a 0.125" length. The first and second ends 60, 62 include cylindrical crevices 66 of the same size as the permanent magnets 64 so that the permanent magnets 64 lie flush with the first and second ends 60, 62 when press fitted into the elongate member 58. The first and second permanent magnets 64 include north and south poles NP, SP. The permanent magnets 64 are inserted into the elongate member 58 so that their poles NP, SP are oriented in opposite direction from each other. For example, the north pole side NP of each permanent magnet 64 faces outward from the first and second ends 60, 62 of the elongate member 58. This allows the first and second permanent magnets 64 to be attracted to local trace amounts of magnetically sensitive material 50 instead of operating like a needle in a compass which always faces due north.

The elongate member 58 illustrated in FIGS. 3-5 is formed from a composite foam material 68. The composite foam material 68 is a syntactic foam. Syntactic foam includes a plurality of hollow glass microspheres 70 embedded in a resin 72. Syntactic foam is generally used for undersea operations which require floatation capabilities at high pressures. Within a pressure vessel adapted to deliver pressurized $CO_2$ to a paintball marker, high pressures up to 3000 psi could be present during refilling of the pressure vessel, or alternatively, as a result of exposure of the pressure vessel 12 to elevated temperatures. The composite foam material 68 can withstand these high pressures while floating on the surface of liquid phase $CO_2$ 39. Syntactic foam is created and purchased in large blocks, such as 24"×12"×6", because surface defects such as voids appear in all formed syntactic foam around the perimeter. Consequently, a plurality of elongate members 58 are cut from one of these large blocks of syntactic foam to avoid the surface defects that would be present if the syntactic foam was used to form individual elongate members 58.

For example, the elongate member 58 can be a 0.3475"× 0.3475"×2.800" syntactic foam block. The elongate member 58 includes a rectangular transverse cross section with a diagonal of approximately 0.491". The permanent magnets 64 are then pressed into the crevices 66 located on both ends 60, 62 of the elongate member 58. The neck 34 of the pressure vessel 12 includes an inner neck diameter $d_1$ of 0.510". Consequently, the diagonal dimension of the elongate member 58 is shorter than the inner neck diameter $d_1$, and the elongate member 58 can be inserted into the pressure vessel 12 through the neck 34 as shown by arrows 74 in FIG. 3. The cylindrical body 36 of the pressure vessel 12 includes an inner body diameter $d_2$ of 2.908". The 2.800" length of the elongate member 58 is less than this inner body diameter $d_2$ and allows the elongate member 58 to rotate freely within the cylindrical body 36 of the pressure vessel 12. This rotation allows the magnetic float assembly 42 to rotate into alignment with the magnetically sensitive indicator 44 as shown in FIGS. 2-3.

To magnetically detect the amount of $CO_2$ within the pressure vessel 12 shown in FIGS. 2-5, a user will tilt the pressure vessel 12 to a substantially vertical orientation as shown in FIG. 2. The vertical orientation of the pressure vessel 12 allows the magnetic float assembly 42 to give an accurate measurement of the liquid phase $CO_2$ 39 level within the pressure vessel 12. The user rotates or swirls the pressure vessel 12 horizontally to orient the magnetic float assembly 42 so that one of the magnets 64 is in alignment with the magnetically sensitive indicator 44. The magnetic force indicated by wave lines 76 causes attraction between the magnetically sensitive particles 50 in the coating 46 and the permanent magnets 64 in the magnetic float assembly 42. These magnetically sensitive particles 50 move towards the magnetic force so that an image is temporarily formed in the coating 46 as shown in FIG. 2. A user can correlate the location of this image to the delineations 56 on the label 48 to conclude that there is approximately 65% $CO_2$ remaining in the pressure vessel 12 of FIG. 2. Alternatively, a user could conclude that there are approximately 325 paintball round shots left if the pressure vessel 12 is rated to provide 500 paintball round shots. This allows a user to determine shot strategy such as when to conserve shots during a battle.

Figure 7:
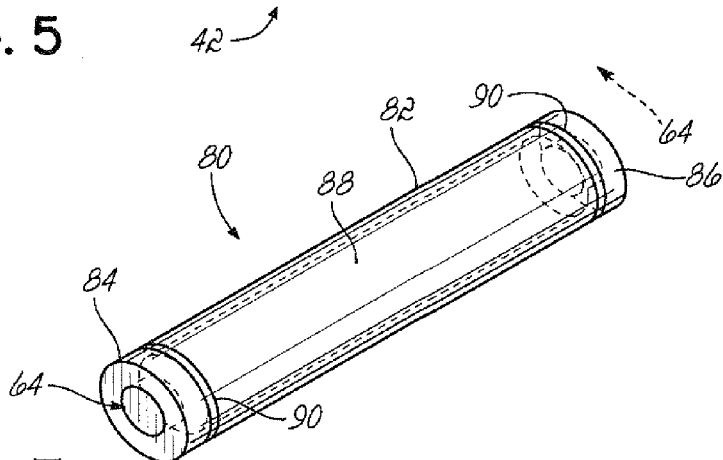
FIG. 7 is a perspective view of the magnetic float assembly illustrated in FIG. 6.
Figure 8:
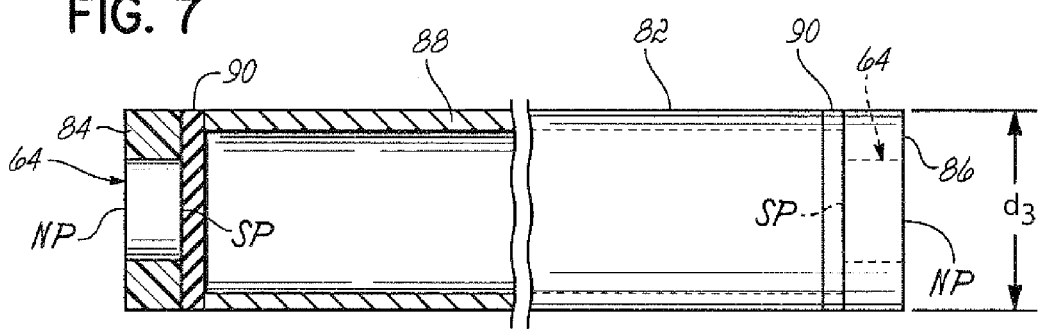
FIG. 8 is a longitudinal cross-sectional view of the magnetic float assembly shown in FIG. 7.
Figure 6:
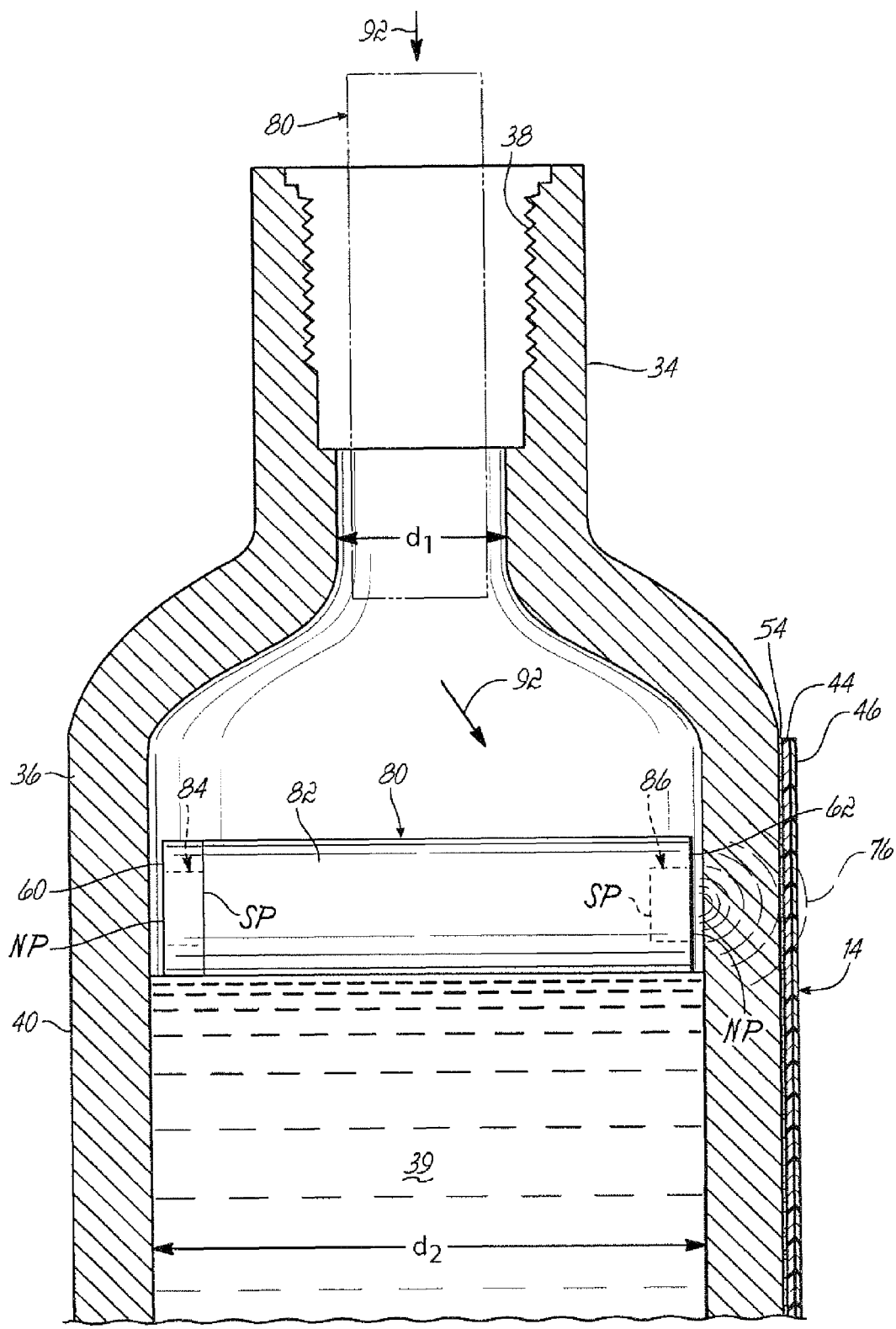
FIG. 6 is a longitudinal cross-sectional view of a pressure vessel according to a second preferred embodiment of the invention.

FIGS. 6 through 8 illustrate the pressure vessel 12 with a second preferred embodiment of a magnetic float assembly 80. Each other element of this embodiment of the pressure vessel 12 is the same as described above and these same elements are referenced by the same reference numerals. In this embodiment, the magnetic float assembly 80 includes an elongate member 82 having first and second ends 84, 86 and permanent magnets 64 inserted into the first and second ends 84, 86 in the same manner as the first embodiment. The elongate member 82 now comprises a tube. For example, the elongate member 82 can be a thin-walled aluminum capsule 88 with nylon ends 84, 86 adapted to hold the permanent magnets 64. The nylon ends 84, 86 are sealed to the aluminum capsule 88 with O-rings 90. Although the transverse cross section of the elongated member 82 of this embodiment is circular rather than rectangular, the outer diameter $d_3$ of the aluminum tube is sized to be about 0.490". This outer diameter $d_3$ is less than the inner neck diameter $d_1$ of 0.510", so the magnetic float assembly 80 can enter the pressure vessel 12 through the neck 34 as shown by arrows 92. Similar to the first embodiment, the elongate member 82 of this embodiment is 2.800" long so that the magnetic float assembly 80 can freely rotate within the cylindrical body 36 of the pressure cylinder 12. In all remaining aspects, this embodiment operates in a similar fashion as the first embodiment for determining the level of liquid phase $CO_2$ 39 or paintball round shots remaining in a pressure vessel 12.

This specification describes two preferred embodiments of the present invention. However, Applicant does not intend to restrict the scope of the appended claims to such detail. Those skilled in the art will recognize that the described embodiments may be subject to a reasonable degree of adaptation depending on the needs and preferences of the user, without departing from the scope of the present invention. Accordingly, Applicant wishes to have the invention defined only by the appended claims.

The invention claimed is:

1. A pressure vessel for holding $CO_2$, comprising:
   a magnetic float assembly disposed within the pressure vessel and adapted to float on liquid-phase $CO_2$ contained within the pressure vessel, over a range of operating vessel temperatures; and
   a magnetically sensitive indicator located on an outer surface of the pressure vessel and adapted to detect and to display the location of the magnetic float assembly, thereby to indicate the level of the liquid phase $CO_2$ within the pressure vessel.

2. The pressure vessel of claim 1, wherein the magnetic float assembly comprises:
   an elongate member having first and second ends; and
   first and second permanent magnets mounted at the first and second ends, respectively, the first and second magnets aligned so that their respective poles are oriented in opposing relation.

3. The pressure vessel of claim 1, wherein the magnetically sensitive indicator comprises:
   a coating applied to a label attached to the pressure vessel, the coating including a plurality of magnetically sensitive particles suspended in a cured colloidal dispersion.

4. The pressure vessel of claim 3, wherein the label is attached to the pressure vessel by adhesive.

5. The pressure vessel of claim 1, wherein the range of operating temperatures comprises any temperature up to about 85 degrees Fahrenheit.

6. The pressure vessel of claim 1, wherein the elongate member comprises a composite foam material.

7. The pressure vessel of claim 6, wherein the composite foam material comprises a syntactic foam having a rectangular transverse cross-sectional shape, the syntactic foam including a plurality of hollow glass microspheres embedded in resin.

8. The pressure vessel of claim 1, wherein the elongate member comprises a tube.

9. The pressure vessel of claim 1, wherein the pressure vessel includes a cylindrical body having an inner body diameter, and the magnetic float assembly has a length shorter than the inner body diameter so that the magnetic float assembly can rotate freely within the cylindrical body.

10. A paintball marker comprising:
    a body including a handle, a firing chamber, a barrel operatively coupled to the firing chamber, and a hopper operatively coupled to the body and adapted to deliver at least one paintball round to the firing chamber;
    a pressure vessel attachable to the body and adapted to supply pressurized $CO_2$ to the firing chamber to expel the at least one paintball round through the barrel; and
    a $CO_2$ level indicator comprising:
    (a) a magnetic float assembly disposed within the pressure vessel and adapted to float on liquid-phase $CO_2$ contained within the pressure vessel, over a range of operating vessel temperatures; and
    (b) a magnetically sensitive indicator located on an outer surface of the pressure vessel and adapted to detect and display the location of the magnetic float assembly, thereby to indicate the level of liquid phase $CO_2$ within the pressure vessel.

11. The paintball marker of claim 10, wherein the magnetically sensitive indicator is adapted to provide an accurate indication of the level of liquid phase $CO_2$ in the pressure vessel when the pressure vessel is in a generally vertical orientation.

12. The pressure vessel of claim 10, wherein the magnetic float assembly comprises:
    an elongate member having first and second ends; and
    first and second permanent magnets mounted at the first and second ends, respectively, the first and second magnets aligned so that their respective poles are oriented in opposing relation.

13. The pressure vessel of claim 10, wherein the magnetically sensitive indicator comprises:
    a coating applied to a label attached to the pressure vessel, the coating including a plurality of magnetically sensitive particles suspended in a cured colloidal dispersion.

14. The pressure vessel of claim 13, wherein the label is attached to the pressure vessel by adhesive.

15. The pressure vessel of claim 10, wherein the range of operating temperatures comprises any temperature that is up to about 85 degrees Fahrenheit and suitable for operation of the paintball marker.

16. The pressure vessel of claim 10, wherein the elongate member comprises a composite foam material.

17. The pressure vessel of claim 16, wherein the composite foam material comprises a syntactic foam having a rectangular transverse cross-sectional shape, the syntactic foam including a plurality of hollow glass microspheres embedded in resin.

18. The pressure vessel of claim 10, wherein the elongate member comprises a tube.

19. The pressure vessel of claim 10, wherein the pressure vessel includes a cylindrical body having an inner body diameter, and the magnetic float assembly has a length shorter than the inner body diameter so that the magnetic float assembly can rotate freely within the cylindrical body.

20. A method of determining the approximate number of remaining paintball rounds that can be shot by a paintball marker, the method comprising:
    orienting a pressure vessel to a substantially vertical orientation, the pressure vessel containing therein liquid phase $CO_2$, the pressure vessel also having a magnetic float assembly adapted to float on the liquid phase $CO_2$ contained therein, the pressure vessel also having a magnetically sensitive indicator located on an outer surface thereof and
    rotating the pressure vessel to rotatably move the magnetic float assembly contained therein, so as to orient the magnetic float assembly into alignment with the magnetically sensitive indicator, thereby causing the vertical position of the magnetic float assembly to be magnetically indicated on the magnetically sensitive indicator.

21. The method of claim 20, further comprising:
    correlating the magnetically indicated position of the magnetic float assembly with an estimated number of remaining paintball rounds.

* * * * *